US008922833B2

(12) United States Patent
Sakai

(10) Patent No.: US 8,922,833 B2
(45) Date of Patent: Dec. 30, 2014

(54) METHOD AND APPARATUS FOR PRODUCING A WEIGHTED MONOCHROME IMAGE

(75) Inventor: Toshifumi Sakai, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 650 days.

(21) Appl. No.: 13/006,318

(22) Filed: Jan. 13, 2011

(65) Prior Publication Data

US 2011/0176176 A1 Jul. 21, 2011

(30) Foreign Application Priority Data

Jan. 15, 2010 (JP) ................................. 2010-007226

(51) Int. Cl.
*H04N 1/40* (2006.01)
(52) U.S. Cl.
CPC .... *H04N 1/40012* (2013.01); *H04N 2201/0081* (2013.01); *H04N 2201/0082* (2013.01); *H04N 2201/0087* (2013.01)
USPC .......................................................... 358/3.01
(58) Field of Classification Search
USPC ................................. 358/3.01; 382/260–262
See application file for complete search history.

(56) References Cited

U.S. PATENT DOCUMENTS

| | | | | |
|---|---|---|---|---|
| 5,917,994 A * | 6/1999 | Perumal et al. | ................. | 358/1.9 |
| 2005/0206775 A1* | 9/2005 | Shiohara | ........................ | 348/360 |
| 2006/0022917 A1* | 2/2006 | Kim | ................................. | 345/83 |
| 2007/0091391 A1* | 4/2007 | Saito | .............................. | 358/530 |
| 2007/0195341 A1* | 8/2007 | Yao | .................................. | 358/1.9 |
| 2009/0109247 A1* | 4/2009 | Kimura | .......................... | 345/690 |
| 2009/0141307 A1* | 6/2009 | Slijp et al. | ..................... | 358/1.15 |
| 2009/0149752 A1* | 6/2009 | Osaka et al. | .................. | 600/438 |
| 2009/0180164 A1* | 7/2009 | Miyagi | ......................... | 358/518 |
| 2010/0053689 A1* | 3/2010 | Ohwaku et al. | .............. | 358/3.27 |
| 2010/0149598 A1* | 6/2010 | Shiohara | ...................... | 358/1.18 |
| 2010/0182661 A1* | 7/2010 | Imayoshi | ...................... | 358/527 |

FOREIGN PATENT DOCUMENTS

JP 2005-260504 A 9/2005

* cited by examiner

*Primary Examiner* — Vincent Rudolph
*Assistant Examiner* — Kevin Ky
(74) *Attorney, Agent, or Firm* — Kilpatrick Townsend & Stockton LLP

(57) ABSTRACT

A method to configure an apparatus to obtain a color image for printing. The apparatus presents the printing option of converting the color image into a standard monochrome image or a color-highlighted monochrome image. Black colored portions of the original color image are shown to be predominantly darker in the standard monochrome image. Colored portions, of a predetermined color of the original color image, are shown to be predominantly darker in the color-highlighted monochrome image, and black colored portions, of the original color image, are less prominent. The apparatus applies filters to the color image to produce the standard or color-high-lighted monochrome image, and outputs whichever option is selected by the user.

16 Claims, 4 Drawing Sheets

APPLICATION OF STANDARD FILTER

APPLICATION OF RED COLOR HIGHLIGHTING FILTER

METHOD AND APPARATUS FOR PRODUCING A WEIGHTED MONOCHROME IMAGE

CROSS REFERENCE TO RELATED APPLICATION

This application claims priority to Japanese Patent Application No. 2010-007226 filed in the Japanese Patent Office on Jan. 15, 2010, the entire contents of which are incorporated herein by reference.

BACKGROUND

The present invention relates to a monochrome image outputting apparatus and a monochrome image producing method.

An apparatus has been described that generates a monochrome image having only one color component, such as Y and the like, in one pixel by weighing and adding the gradation value of each color in regard to each pixel in a color image having multiple color components, such as RGB and the like, in one pixel, taken by a digital camera (for example, refers to JP-A-2005-260504). This apparatus displays a green filter, a yellow filter, an orange filter, a red filter, and no filter as selectable items on the display, receives the selection of a filter to be used, and converts a color image to a monochrome image according to the weight that corresponds to the selected filter.

However, in the aforementioned filter, since black becomes the most highlighted color in all cases, it is not always possible to generate a monochrome image that fits a user's desire. For example, considering the case of monochromatically converting a color document where important characters are written in red and the other characters are written in black, the application of any of the above filters generates a monochromatically converted document where black characters have a prominent color and red characters have a color as dark as the black characters or lighter than the black characters, which results in important characters being made less prominent than desired.

SUMMARY

An advantage of some aspects of the image outputting apparatus and the monochrome image producing method of the invention is to generate a monochrome image that more appropriately reflects on a color image which are intended to be emphasized.

The monochrome image outputting apparatus monochrome image producing method of the invention has adopted the following units to achieve the aforementioned advantage.

According to a first aspect of the invention, there is provided an image outputting apparatus that outputs an image including a color image obtaining unit that obtains a color image that expresses the image with multiple colors; a monochrome image generating unit that generates a monochrome image being made monochrome by weighing and adding the gradation value of each color component with a first weighting coefficient for highlighting a predetermined color, so as to make the predetermined color portions on the obtained color image have a darker color than black portions on the color image; and a monochrome image outputting unit that outputs the generated monochrome image.

The image outputting apparatus according to the invention obtains a color image that expresses the image with multiple colors, and generates a monochrome image being made monochrome by weighing and adding the gradation value of each color component with the first weighting coefficient for highlighting a predetermined color so as to make the predetermined color portions on the obtained color image have a darker color than black portions on the color image, and outputs the generated monochrome image. Thereby, it is possible to generate a monochrome image that more appropriately reflects the portions on a color image which are intended to be emphasized by using a weighting coefficient for highlighting a predetermined color. Here, the predetermined color includes red color. In addition, the image outputting unit may be a unit that prints the generated monochrome image.

In such an image outputting apparatus according to the invention, the multiple colors refer to three colors of red, green, and blue, and the monochrome image generating unit may calculate the gradation value of the monochrome image with a formula $\{Y=r(R)+g(G)+b(B)+\alpha\}$, in which Y represents the gradation value of the monochrome image, R represents the red gradation value on the color image, G represents the green gradation value on the color image, B represents the blue gradation value on the color image; and r, g, b and $\alpha$ are constant numbers, and using the calculation, may execute at least either setting Y as a new lower limit in a case in which the calculated Y is equal to or less than the old lower limit or setting Y as a new upper limit in a case in which the calculated Y is equal to or more than the old upper limit. In this type of the image outputting apparatus according to the invention, the monochrome image generating unit may be a unit for which the constant value $\alpha$ is set to a value larger than 0 and smaller than 1 depending on the extent to which black is made a lighter color, the total sum of r, g, b and $\alpha$ equals 1, and, out of the constant values r, g and b, the constant value corresponding to a color to highlight is set to a negative value in a case in which each of R, G, B and Y has the lower limit of 0 and the upper limit of 1 and in which it is normalized so that $R=G=B=0$ or $Y=0$ represents black, and $R=G=B=1$ or $Y=1$ represents white.

In addition, in the image outputting apparatus according to the invention, the monochrome image generating unit may include at least a first monochrome image generating unit that generates a monochrome image being made monochrome by weighing and adding the gradation value of each color component with the first weighting coefficient for highlighting a predetermined color; and a second monochrome image generating unit that generates a monochrome image being made monochrome by weighing and adding the gradation value of each color component with a second weighting coefficient for highlighting non-predetermined colors, that is different from the first weighting coefficient, and may further include a selection unit that selects which weighting coefficient to use based on a user's instruction so that the monochrome image generating unit generates a monochrome image by using the weighting coefficient selected at the selection unit. Thereby, it is possible to highlight or not to highlight a predetermined color according to a user's selection.

According to a second aspect of the invention, there is provided machine readable instructions for causing a computer to be configured as any of the aforementioned print controlling apparatuses disclosed herein. The instructions may be recorded on a tangible computer-readable recording medium (for example, hard disk, ROM, FD, CD, DVD and the like), in a permanent or temporary manner (e.g., RAM, processing cache, register memory, etc.). Executing these instructions on a computer can obtain a similar result to the aforementioned print controlling apparatus.

According to a third aspect of the invention, there is provided a monochrome image producing method that produces a monochrome image including (a) obtaining a color image that expresses an image with multiple colors; and (b) generating a monochrome image being made monochrome by weighing and adding the gradation value of each color component with the first weighting coefficient for highlighting a predetermined color to make the predetermined color portions on the obtained color image have a darker color than black portions on the color image.

The monochrome image producing method according to the invention obtains a color image that expresses the image with multiple colors, and generates a monochrome image being made monochrome by weighing and adding the gradation value of each color component with the first weighting coefficient for highlighting a predetermined color to make the predetermined color portions on the obtained color image have a darker color than black portions on the color image. Thereby, it is possible to generate a monochrome image that more appropriately reflects the portions on a color image which are intended to be emphasized using a weighting coefficient for highlighting a predetermined color. Any of the methods disclosed herein can be configured as machine readable instructions recorded on a tangible machine readable medium in a permanent or temporary manner (e.g., RAM, processing cache, register memory, etc.).

BRIEF DESCRIPTION OF THE DRAWINGS

The invention will be described with reference to the accompanying drawings, wherein like numbers reference like elements.

DETAILED DESCRIPTION

Figure 1:
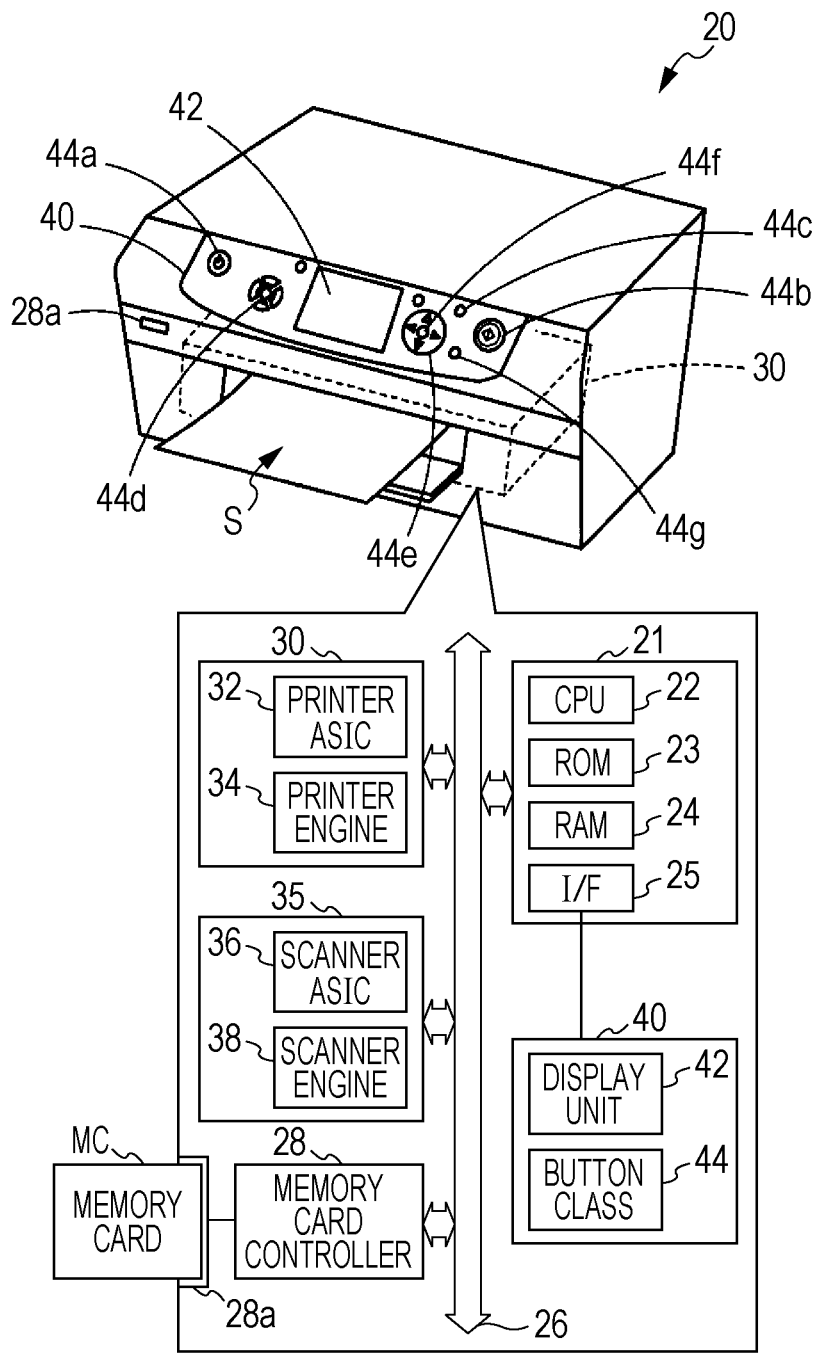
FIG. 1 is a schematic diagram of configuration of a multifunction printer according to the present embodiment.

FIG. 1 is a configuration diagram showing the outline of the configuration of a multifunction printer 20 that is an embodiment of the invention. The multifunction printer 20 according to the embodiment includes a printer unit 30 that performs a printing by ejecting ink as colorant on a recording paper S; a scanner unit 35 that generates image data by optically reading a document placed on the platen; a memory card controller 28 which is in charge of the input and output of data with respect to a memory card MC inserted in a memory card slot 28a; an operating panel 40 where a user can perform a variety of operations; and a main controller 21 which is in charge of the control of the entire apparatus.

The printer unit 30 includes a printer ASIC 32 and a printer engine 34. The printer ASIC 32 is an integrated circuit that controls the printer engine 34, and, when receiving a printing command from the main controller 21, controls the printer engine 34 to print an image on the recording paper S based on an image file that is the target of the printing command. The printer engine 34 is configured as an ink jet type color printer mechanism that performs a printing by ejecting ink onto a sheet of paper from the printing head. Here, ASIC is an abbreviation of Application Specific Integrated Circuit.

The scanner unit 35 includes a scanner ASIC 36 and a scanner engine 38. The scanner ASIC 36 is an integration circuit that controls the scanner engine 38, and, when receiving a scanning command from the main controller 21, controls the scanner engine 38 to read a document placed on the platen as image data. In addition, the scanner engine 38 is configured as a well-known image scanner, and includes a well-known color image sensor that emits light toward the document and decomposes the reflected light into each color of red (R), green (G), and blue (B) so as to generate scan data.

The memory card controller 28 is a unit that performs the input and output of data with respect to the memory card MC inserted in the memory card slot 28a being arranged next to the operating panel 40. The memory card controller 28 reads a file stored in the memory card MC and transfers it to the main controller 21 when the memory card MC is inserted in the memory card slot 28a or, upon inputting a command from the main controller 21, writes data on the memory card MC based on the command.

The operating panel 40 includes a display unit 42 and button 44. The display unit 42 is a liquid crystal display and displays a variety of operating screens and the like that performs the selection or setting of menus. In addition, the buttons 44 includes a power supply button 44a for turning the power supply on and off; a start button 44b that commands the starting of printing or copying; a setting button 44c for performing a variety of printing setting or copying setting; a mode selection button 44d that selects a variety of modes; up/down and left/right arrow keys 44e for selecting a variety of items or settings; an OK button 44f for validating the selected settings; and a return button 44g that returns to the previous screen. The buttons 44 are set so that a user's instruction can be inputted to the main controller 21 via an internal communication interface 25. Here, examples of the modes that can be selected by the mode selection button 44d include a copy mode that scans and copies a document placed on the platen; a memory card mode that prints an image stored in the memory card MC or scans a document to generate data and then stores the data in the memory card MC; and a film mode that scans and then prints a photo file or stores data in the memory card MC.

The main controller 21 is configured as a micro processor having a CPU 22 as an element, and includes a ROM 23 that stores a variety of processing programs, data, tables, and the like; a RAM 24 that temporarily stores scan data or print data; and the internal communication interface 25 that enables communication with the operating panel 40, all of which are connected one another to enable the exchange of signals via a bus 26. The main controller 21 inputs a variety of action signals and detecting signals from the printer unit 30, the scanner unit 35, and the memory card unit 28 or inputs operating signals generated according to the operations on the buttons 44 in the operating panel 40. In addition, the main controller 21 outputs the memory card controller 28 a command to read an image file from the memory card MC and then output the file to the main controller 21, outputs a command to the printer unit 30 to perform the printing of image data, outputs a command to the scanner unit 35 to read a document placed on the platen as image data based on a scanning command from the buttons 44 in the operating panel 40, and outputs the controlling command of the display unit 42 to the operating panel 40.

Figure 2:
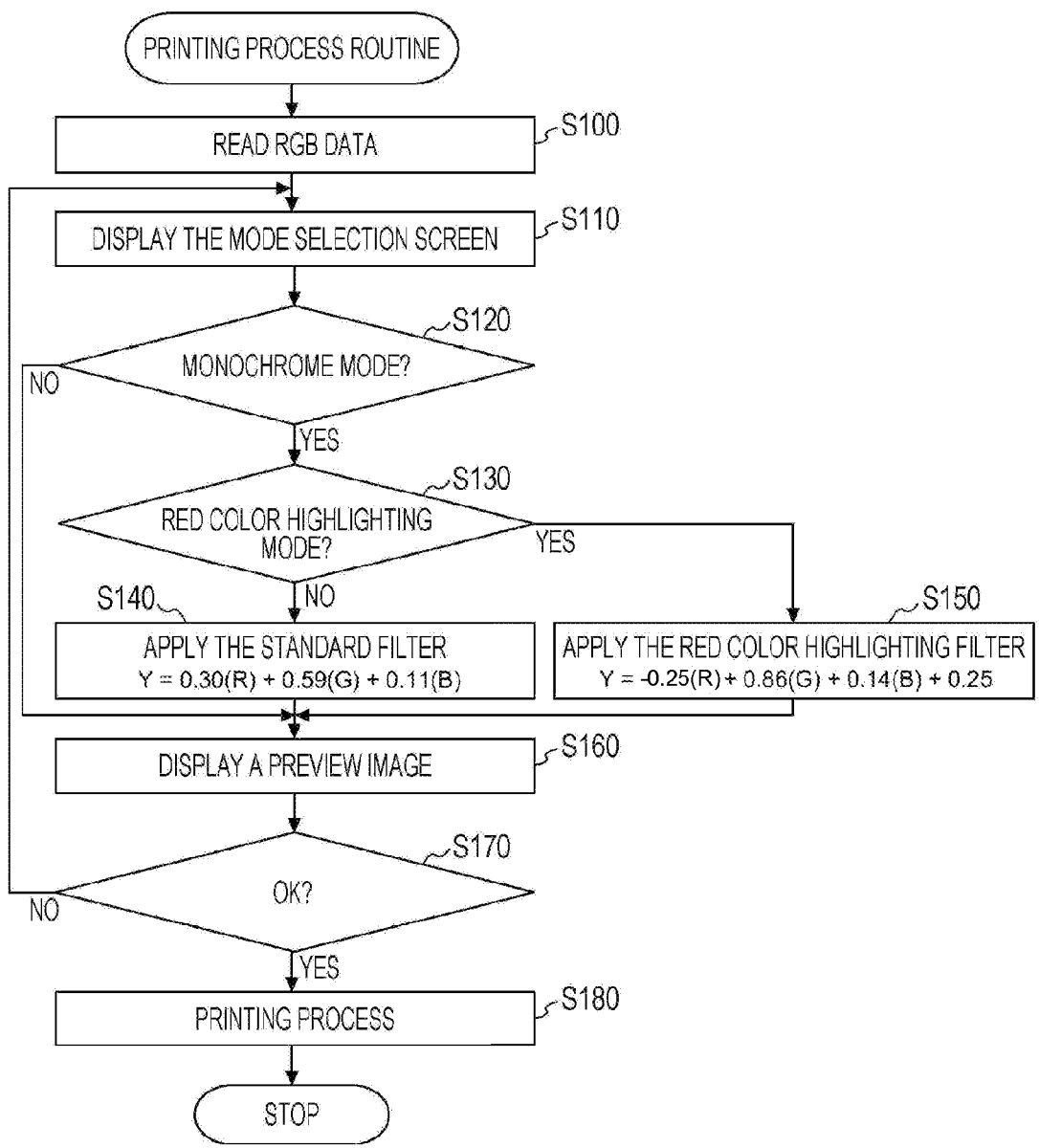
FIG. 2 is a flowchart showing an example of a printing process routine.

Next, the operation of the multifunction printer 20 according to the embodiment configured in this manner, particularly the operation when converting a color image to a monochrome image and printing the monochrome image will be described. FIG. 2 is a flowchart showing an example of a printing process routine executed by the main controller 21. This process is executed, for example, when the memory card mode is selected using the mode selection button 44d, and then there is a command for printing of an image file selected from the image files held in the memory card MC using the operation of the arrow keys 44e and the OK button 44f on a photo selection screen (not shown) in a state in which monochrome printing is designated using the setting button 44c.

Figure 3:
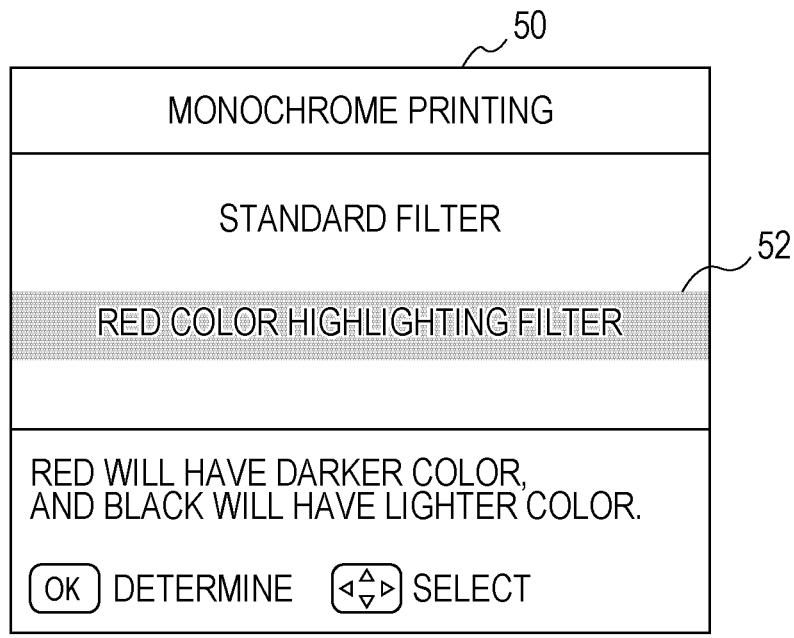
FIG. 3 is an explanatory drawing showing an example of a mono colorization filter selection screen.

When the printing process routine is executed, the CPU 22 in the main controller 21, first of all, reads the selected color image (RGB data) from the memory card MC (Step S100) and displays a printing mode selection screen to receive the selection of a printing mode by a user (Step S110). In the embodiment, a color selection screen that receives the selection of either of a color mode that performs color printing or a monochrome mode that performs monochrome printing is displayed, and, when the monochrome mode is selected on the color selection screen, the process further moves to a filter selection screen 50 that receives the selection of a mono colorization filter that is used for mono colorization. FIG. 3 shows an example of the filter selection screen 50. On the filter selection screen 50, as shown in the figure, as selectable mono colorization filters, "standard filter" and "red highlighting filter" that makes red have a darker color and black have a lighter color than the standard filter are prepared, and selection can be made by moving a cursor 52 to the desired filter using the up/down keys in the arrow keys 44e and pressing the OK button 44f. After receiving a variety of selections in this manner, whether the monochrome mode has been selected or not (Step S120), and, when the monochrome mode has been selected, whether the red highlighting mode has been selected or not (Step S130) are each determined. When the monochrome mode is selected and the standard filter is selected, a monochrome image is generated by setting the gradation value for each pixel using the formula (1) $\{Y=0.30(R)+0.59(G)+0.11(B)\}$ (Step S140) and a preview is displayed based on the generated monochrome image (Step S160). On the other hand, when the monochrome mode is selected and the red highlight filter is selected, a monochrome image is generated by setting the gradation value for each pixel using the formula (2) $\{Y=-0.25(R)+0.86(G)+0.14(B)+0.25\}$ (Step S150) and a preview is displayed based on the generated monochrome image (Step S160). Here, in the formula, "Y" represents the gradation value of the brightness of a monochrome image, "R" represents the red gradation value a color image, "G" represents the green gradation value on a color image, and "B" represents the blue gradation value on a color image. In addition, the gradation values of R, G and B are each normalized to have the lower limit of 0 and the upper limit of 1, therefore (1, 1, 1) represents white, and (0, 0, 0) represents black. In addition, the gradation value Y of the brightness of a monochrome image is also normalized, so the value of 1 represents white and the value of 0 represents black. Now, if "r" is set as the red weighting coefficient, "g" is set as the green weighting coefficient, "b" is set as the blue weighting coefficient, and "α" is set as a fourth gradation value, the gradation value Y of a monochrome image can be expressed by the formula (3) $\{Y=r(R)+g(G)+b(B)+\alpha\}$. In this case, to make black have a lighter color, it is desirable to make the fourth gradation value α larger than 0 to make the gradation value Y of a monochrome image larger than 0 when all of R, G, B are 0, and to make red color darker, it is desirable to reduce the red weighting coefficient r as much as possible to reduce the influence of the red gradation value R on the gradation value Y of a monochrome image within a range in which the total of the weighting coefficients of r, g and b, and the fourth gradation value α equals 1.

The aforementioned formula (2) $\{Y=-0.25(R)+0.86(G)+0.14(B)+0.25\}$ can be obtained by setting each of the weighting coefficients of r, g and b to satisfy a condition that the total of the red weight coefficient r and the fourth gradation value α becomes 0, a condition that the green weighting coefficient g becomes about six times as large as the blue weighting coefficient b (g=6×b) according to the ratio of the weighting coefficients in the standard filter (r:g:b=3:6:1), and a condition that the fourth gradation value α becomes 0.25. Also, Y is set to 1 when Y becomes a value of 1 or more, and Y is set to 0 when Y becomes a value of 0 or less. In addition, if Step S120 determines it is not a monochrome mode, that is, determines it is a color mode, a preview of a color image based on the red RGB data is displayed (Step S160).

Once such preview display is performed, there is a wait for the OK button 44f to be pressed (Step S170), and when the OK button 44f is pressed, a printing command is outputted to the printer ASIC to execute the printing based on the generated image (Step S180), thereby completing the present routine.

Figure 4A:
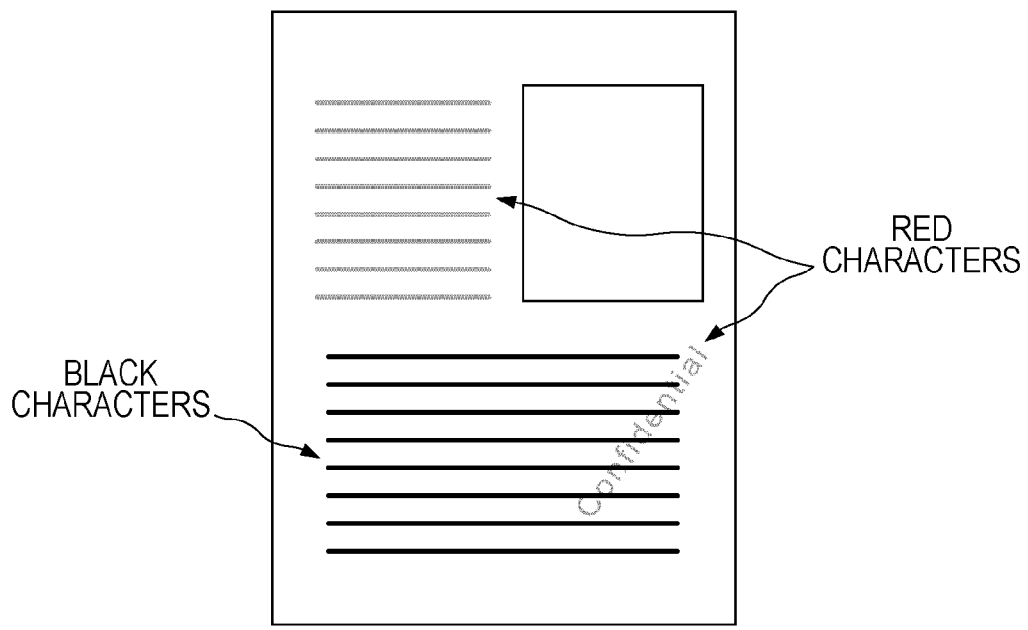
FIGS. 4A and 4B are explanatory drawings showing an example of a monochrome image after a red color highlighting filter has been applied.
Figure 4B:
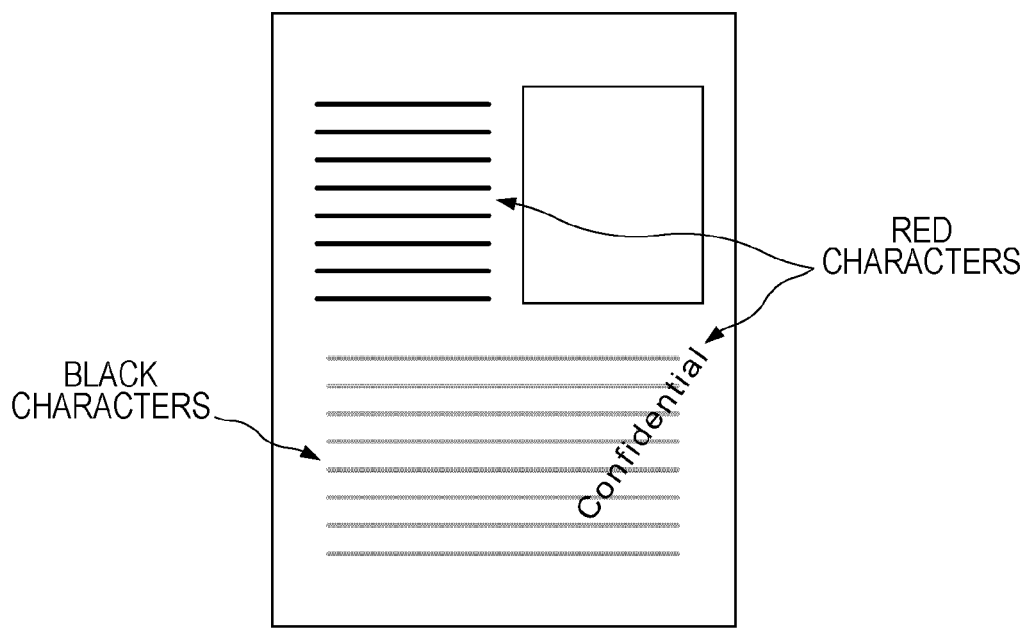

FIG. 4 shows an example of a monochrome image after the red highlighting filter has been applied. Now, a case is considered in which a color document including important items written in red is printed. In this case, it can be understood that, when the standard filter is applied to the color document and monochrome printing is performed, red character portions are displayed more lightly than black character portions, so the important portions becomes more difficult to see than the other portions (refer to FIG. 4A), but when the red highlighting filter is applied to the color document and monochrome printing is performed, compared with the standard filter, red character portions become darker and black character portions become lighter, so the important portions becomes easier to see (refer to FIG. 4B).

Here, the correspondence relationship between the components of the embodiment and the components of the invention will be made clear. The main controller 21 that executes Step S100 in the monochrome printing process routine in FIG. 2 of the embodiment corresponds to the "color image obtaining unit" of the invention, and the main controller 21 that executes the process of Steps S110 to S150 corresponds to the "monochrome image outputting unit", and the main controller 21 and the printer ASIC 32 that execute the process of Step S180 correspond to the "monochrome image printing unit". Here, in the embodiment, an example of the monochrome image producing method according to the invention has been made clear by describing the operation of the multifunction printer 20.

According to the multifunction printer 20 of the embodiment described in the above, when monochrome printing is commanded, if the red highlighting filter is selected as the mono colorization filter, a color image is converted to a monochrome image by using the mono colorization filter of formula (2) $\{Y=-0.25(R)+0.86(G)+0.14(B)+0.25\}$ so that red has a darker color and black has a lighter color than the standard, and then the printing is performed based on the converted monochrome image, so it is possible to generate a monochrome image that more appropriately reflects the portions on the color image which are intended to be emphasized.

In the aforementioned embodiment, as one of the mono colorization filters, the red highlighting filter that highlights red more than black is prepared, but the invention is not limited thereto and may also include, for example, an embodiment that prepares a green highlighting filter that highlights green more than black, an embodiment that prepares a blue highlighting filter that highlights blue more than black, and an embodiment that prepares another color highlighting filter as long as the filter is a mono colorization filter that highlights a predetermined color more than black. In the case of the green color highlighting filter, for example, a mono colorization filter of formula (4) {Y=0.75(R)−0.25(G)+0.25(B)+0.25} can be used, and, in the case of the blue highlighting filter, for example, a mono colorization filter of formula (5) {Y=0.33 (R)+0.67(G)−0.25(B)+0.25} can be used. Here, formula (4) can be obtained by setting each of the weighting coefficients of r, g and b to satisfy a condition that the total of the green weight coefficient g and the fourth gradation value α becomes 0, a condition that the red weighting coefficient r becomes about three times as large as the weighting coefficient b of blue color (r=3×b) according to the ratio of the weighting coefficients in the standard filter (r:g:b=3:6:1), and a condition that the fourth gradation value α becomes 0.25. Formula (5) can be obtained by setting each of the weighting coefficients of r, g and b to satisfy a condition that the total of the blue weight coefficient b and the fourth gradation value α becomes 0, a condition that the green weighting coefficient g becomes about twice as large as the red weighting coefficient r (g=2×r) according to the ratio of the weighting coefficients in the standard filter (r:g:b=3:6:1), and a condition that the fourth gradation value α becomes 0.25. Here, Y is set to 1 when Y becomes a value of 1 or more, and Y is set to 0 when Y becomes a value of 0 or less.

In the aforementioned embodiment, the fourth gradation value α is set to 0.25 to make black have a lighter color, and, out of the weighting coefficients of the colors r, g and b, the weighting coefficient of a color to highlight is set so as to make the total with the fourth gradation value α equal 1, but the invention is not limited thereto and the fourth gradation value α and the weighting coefficient of a color to highlight may be set to any value. However, the larger the fourth gradation value α is, the lighter the black color becomes, and the smaller the fourth gradation value α is, the darker the black becomes, and the smaller the weighting coefficient of a color to highlight is, the darker the color to highlight becomes. In addition, out of the weighting coefficients of the colors r, g and b, the weighting coefficients of the remaining colors that are not highlighted are set by using the ratio of the weighting coefficients in the standard filter, but it is not necessarily required that the ratio of the standard filter is used.

In the aforementioned embodiment, a preview screen is displayed to receive a user's confirmation after a mode is selected, but the invention is not limited thereto and an image to be printed may be previewed when each mode is executed in the step of mode selection. In this case, it is possible to reduce a color image to a predetermined resolution and, by using each filter on the reduced color image, convert a reduced monochrome image corresponding to each filter and then display the reduced monochrome image corresponding to the mode together with the mode name when a mode is selected. Thereby, a user can easily select a desirable filter. Here, in this case, after a user selects a mode, it is possible to execute the processes of Step S120 to Step S180 in the same manner as the aforementioned embodiment, and to not perform the processes of Step S160 and Step S170 in the aforementioned embodiment.

In the aforementioned embodiment, the invention has been described in application to the multifunction printer 20, but the invention is not limited thereto and it is possible to apply, for example, a printer having a scanner function or a FAX machine, or any apparatus that converts a color image to a monochrome image and outputs it for printing.

In the aforementioned embodiment, the invention has been described in the form of an image outputting apparatus, but may be described in a form of a monochrome image producing method that causes a computer serve as an image outputting apparatus.

The invention is not limited to the aforementioned embodiments in any way, and can be performed in various aspects, such as combinations of the disclosed embodiments, within the technical scope of the invention.

What is claimed is:

1. A printing apparatus that outputs an image comprising:
   a color image obtaining unit configured to obtain a color image having multiple colors, which includes a predetermined color portion and a black portion;
   a monochrome image generating unit configured to generate a monochrome image from the color image, wherein the monochrome image generating unit darkens the predetermined color portion of the color image and lightens the black portion; and
   a monochrome image printing unit configured to print the generated monochrome image,
   wherein the monochrome image generating unit is configured to generate the monochrome image by weighting gradation values of each multiple color with respective weighting coefficients,
   wherein the multiple colors are red, green, and blue; and the monochrome image generating unit is configured to calculate the gradation value of the monochrome image by a formula {Y=r(R)+g(G)+b(B)+α}, wherein:
   Y represents a gradation value of the brightness of the monochrome image,
   R represents a red gradation value on the color image,
   G represents a green gradation value on the color image,
   B represents a blue gradation value on the color image, and
   r, g, b, and α are constant values; and
   wherein the monochrome image generating unit is configured to execute both of:
   assigning Y as a new lower limit when the calculated Y is equal to or less than an old lower limit; and
   assigning Y as a new upper limit when the calculated Y is equal to or more than an old upper limit,
   wherein constant α is set to a value larger than 0 and smaller than 1 depending on an extent to which black is made into a lighter color, the total sum of the constant values r, g, b, and α equals 1, and
   whichever constant corresponding to the color to darken out of constants r, g, and b, is set to a negative value, when: the predetermined color is not black; each of R, G, B and Y has the lower limit of 0 and the upper limit of 1; and each of R, G, B, and Y is normalized such that R=G=B=0 or Y=0 represents black, and R=G=B=1 or Y=1 represents white.

2. The printing apparatus of claim 1, wherein the predetermined color is red.

3. The printing apparatus of claim 1, wherein the monochrome image generating unit comprises:
   at least a first monochrome image generating unit configured to generate a first type of the monochrome image by a color-highlighting monochromization process when a first color is selected to be the predetermined color according to a user input, and
   a second monochrome image generating unit configured to generate a second type of the monochrome image by a color-highlighting monochromization process when the first color is not selected to be the predetermined color and when a second color is selected to be the predetermined color according to the user input; and
   a selection unit configured to select which first or second type of monochrome image to generate based on the user input, wherein the monochrome image generating unit is configured to generate the selected type of monochrome image.

4. The printing apparatus of claim 3, wherein the second color is black.

5. The printing apparatus of claim 4, wherein the monochrome image outputting unit is configured to print the generated selected type of the monochrome image.

6. The printing apparatus of claim 1, further comprising:
a machine readable medium that stores instructions which when executed by a processor causes the color image obtaining unit and monochrome image generating unit to each perform as configured.

7. A monochrome image producing method comprising:
receiving, at a processor, a command to convert a color image to a monochrome image according to a color highlighting filter; and
converting, using the processor, the color image to the monochrome image according to the color highlighting filter,
wherein the color-highlighting filter is configured to increase visibility of a predetermined color originally present on the color image, and decrease visibility of black portions originally present on the color image,
wherein the color-highlighting filter comprises a formula which applies different respective weighting coefficients to first, second, and third color gradation values of the color image, and
sums the first, second, and third weighted gradation values with a fourth gradation value to provide a monochrome image gradation value of the brightness of the monochrome image,
wherein the fourth gradation value is preselected to lighten the black portions of the color image.

8. The monochrome image producing method of claim 7, further comprising:
presenting, using the processor, a first selection to convert the color image to the monochrome image according to a standard filter; and
presenting, using the processor, a second selection to convert the color image to the monochrome image according to the color-highlighting filter,
wherein the second selection is selected to provide the command to covert the color image into the monochrome image.

9. The monochrome image producing method of claim 8, wherein the predetermined color of the standard filter black.

10. The monochrome image producing method of claim 7, further comprising:
outputting, from the processor, the monochrome image to a display for previewing by a user.

11. The monochrome image producing method of claim 10, further comprising:
receiving, at the processor, a command to print the previewed monochrome image; and
outputting, using the processor, the previewed monochrome image to a printing device.

12. The monochrome image producing method of claim 7, wherein the gradation values of the color image comprise red, green, and blue gradation values.

13. The monochrome image producing method of claim 7, wherein the color image comprises red and black colored text and wherein the predetermined color is red, and
wherein the monochrome image comprises darker than red colored text that replaces the red colored text and lighter than black colored text that replaces the black text.

14. A machine readable medium comprising non-transitory instructions that when executed by a processor performs a method comprising:
receiving, at the processor, a command to convert a color image to a monochrome image according to a color highlighting filter; and
converting, using the processor, the color image to the monochrome image according to the color highlighting filter,
wherein the color-highlighting filter is configured to increase visibility of a predetermined color originally present on the color image, and decrease visibility of black portions originally present on the color image,
wherein the color-highlighting filter comprises a formula which applies different respective weighting coefficients to first, second, and third color gradation values of the color image, and
sums the first, second, and third weighted gradation values with a fourth gradation value to provide a monochrome image gradation value of the brightness of the monochrome image,
wherein the fourth gradation value is preselected to lighten the black portions of the color image.

15. A printing apparatus comprising a processor, the processor being coupled to a printing unit via a bus, wherein the processor is adapted to perform a method comprising:
receiving a command to convert a color image to a monochrome image according to a color highlighting filter; and
converting, using the processor, the color image to the monochrome image according to the color highlighting filter,
wherein the color-highlighting filter is configured to increase visibility of a predetermined color originally present on the color image, and decrease visibility of black portions originally present on the color image
wherein the color-highlighting filter comprises a formula which applies different respective weighting coefficients to first, second, and third color gradation values of the color image, and
sums the first, second, and third weighted gradation values with a fourth gradation value to provide a monochrome image gradation value of the brightness of the monochrome image,
wherein the fourth gradation value is preselected to lighten the black portions of the color image.

16. A printing apparatus that outputs an image comprising:
a color image obtaining unit configured to obtain a color image having multiple colors, which includes a predetermined color portion and a black portion;
a monochrome image generating unit configured to generate a monochrome image from the color image, wherein the monochrome image generating unit darkens the predetermined color portion of the color image and lightens the black portion; and
a monochrome image printing unit configured to print the generated monochrome image,
wherein the monochrome image generating unit is configured to generate the color image from the monochrome image according to a color highlighting filter,
wherein the color-highlighting filter comprises a formula which applies different respective weighting coefficients to first, second, and third color gradation values of the color image, and sums the first, second, and third weighted gradation values with a fourth gradation value to provide a monochrome image gradation value of the brightness of the monochrome image,
wherein the fourth gradation value is preselected to lighten the black portions of the color image.

* * * * *